(12) United States Patent
Ott et al.

(10) Patent No.: US 11,247,250 B2
(45) Date of Patent: Feb. 15, 2022

(54) ADDITIVE MANUFACTURED CONGLOMERATED POWDER REMOVAL FROM INTERNAL PASSAGES

(71) Applicant: United Technologies Corporation, Farmington, CT (US)

(72) Inventors: Joe Ott, Enfield, CT (US); Wendell V. Twelves, Jr., Glastonbury, CT (US); Lexia Kironn, Rocky Hill, CT (US); Evan Butcher, Suffield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 466 days.

(21) Appl. No.: 16/262,050

(22) Filed: Jan. 30, 2019

(65) Prior Publication Data

US 2019/0160498 A1 May 30, 2019

Related U.S. Application Data

(62) Division of application No. 14/946,874, filed on Nov. 20, 2015, now Pat. No. 10,232,414.

(51) Int. Cl.
| | |
|---|---|
| *B08B 7/00* | (2006.01) |
| *B23K 26/14* | (2014.01) |
| *B23K 26/146* | (2014.01) |
| *B08B 9/043* | (2006.01) |
| *B22F 3/24* | (2006.01) |

(Continued)

(52) U.S. Cl.
CPC ............ *B08B 7/0064* (2013.01); *B08B 9/043* (2013.01); *B08B 9/0433* (2013.01); *B22F 3/24* (2013.01); *B22F 5/10* (2013.01); *B22F 10/20* (2021.01); *B23K 26/146* (2015.10); *B29C 64/35* (2017.08); *B33Y 80/00* (2014.12); *B08B 7/0042* (2013.01); *B08B 7/0071* (2013.01); *B22F 2003/247* (2013.01); *B22F 2005/103* (2013.01); *B22F 2203/11* (2013.01); *B29L 2023/004* (2013.01);

(Continued)

(58) Field of Classification Search
None
See application file for complete search history.

(56) References Cited

U.S. PATENT DOCUMENTS

| | | | |
|---|---|---|---|
| 4,698,543 | A | 10/1987 | Patton |
| 5,746,736 | A | 5/1998 | Tankovich |

(Continued)

FOREIGN PATENT DOCUMENTS

| | | |
|---|---|---|
| EP | 1634656 A1 | 3/2006 |
| GB | 2517490 A | 2/2015 |

(Continued)

OTHER PUBLICATIONS

Machine translation of Japan Patent No. 8-099,223-A, Jun. 2021.*
EP Search Report dated Apr. 13, 2017 issued for corresponding European Patent Application No. 16199691.3.

*Primary Examiner* — Geoffrey S Evans
(74) *Attorney, Agent, or Firm* — Bachman & LaPointe, P.C.

(57) ABSTRACT

A tool includes a head that extends form the flexible section, an emitter within the head; and a nozzle to eject a cooling fluid therefrom. A method of additively manufacturing a component including delivering series of thermal shocks to a conglomerated powder within an internal passage of an additively manufactured component to facilitate removal of the conglomerated powder.

14 Claims, 4 Drawing Sheets

(51) Int. Cl.
    *B22F 5/10* (2006.01)
    *B33Y 80/00* (2015.01)
    *B29C 64/35* (2017.01)
    *B22F 10/20* (2021.01)
    *B29L 23/00* (2006.01)
    *B33Y 10/00* (2015.01)
    *B33Y 40/00* (2020.01)
(52) U.S. Cl.
    CPC .............. *B33Y 10/00* (2014.12); *B33Y 40/00* (2014.12); *Y02P 10/25* (2015.11)

(56) References Cited

U.S. PATENT DOCUMENTS

| | | |
|---|---|---|
| 6,288,362 B1 | 9/2001 | Thomas et al. |
| 6,953,458 B2 | 10/2005 | Loeb |
| 6,995,334 B1 | 2/2006 | Kovacevic et al. |
| 7,777,155 B2 | 8/2010 | Twelves, Jr. et al. |
| 8,383,985 B2 | 2/2013 | Twelves, Jr. et al. |
| 8,488,994 B2 | 7/2013 | Hanson et al. |
| 8,506,836 B2 | 8/2013 | Szuromi et al. |
| 8,718,522 B2 | 5/2014 | Chillscyzn et al. |
| 8,879,957 B2 | 11/2014 | Hanson et al. |
| 8,961,167 B2 | 2/2015 | Swanson et al. |
| 8,985,497 B2 | 3/2015 | Mannella et al. |
| 8,994,592 B2 | 3/2015 | Scott et al. |
| 9,023,566 B2 | 5/2015 | Martin |
| 9,023,765 B1 | 5/2015 | Rimmer et al. |
| 9,029,058 B2 | 5/2015 | Martin |
| 9,039,917 B2 | 5/2015 | Szuromi et al. |
| 9,050,753 B2 | 6/2015 | Rodgers et al. |
| 9,050,788 B2 | 6/2015 | Swanson et al. |
| 9,073,263 B2 | 7/2015 | Mannella et al. |
| 9,079,803 B2 | 7/2015 | Xu |
| 9,114,478 B2 | 8/2015 | Scott et al. |
| 9,120,270 B2 | 9/2015 | Chen et al. |
| 2003/0212394 A1 | 11/2003 | Pearson et al. |
| 2014/0008482 A1 | 1/2014 | Muto |
| 2015/0047673 A1* | 2/2015 | White ................. B08B 7/0092 134/7 |
| 2015/0076125 A1 | 3/2015 | Toyosawa et al. |
| 2015/0165497 A1 | 6/2015 | Bozso et al. |
| 2016/0285228 A1 | 9/2016 | Gapontsev et al. |
| 2017/0144382 A1 | 5/2017 | Ott et al. |

FOREIGN PATENT DOCUMENTS

| | | |
|---|---|---|
| JP | 08099223 A * | 4/1996 |
| JP | 08099223 A | 4/1996 |
| WO | 2014008482 A1 | 1/2014 |

* cited by examiner

ADDITIVE MANUFACTURED CONGLOMERATED POWDER REMOVAL FROM INTERNAL PASSAGES

CROSS-REFERENCE TO RELATED APPLICATION

The instant application is a divisional application of U.S. patent application Ser. No. 14/946,874 filed Nov. 20, 2015.

BACKGROUND

The present disclosure relates to additive manufacturing and, more particularly, to removing conglomerated powder from within an internal passage.

Precision engineered parts such as gas turbine components may be manufactured by an additive manufacturing operation such that features associated with conventional manufacturing processes, e.g., machining, forging, welding, casting, etc. can be eliminated to facilitate savings in cost, material, and time. Additive manufacturing often results in conglomerated powder building-up around, and within, the completed component as an artifact of the process. When additive manufacturing a component that has internal passages, this conglomerated powder often becomes entrapped in the internal passages and is difficult to remove.

For example, an Electron Beam Melting (EBM) additive process partially sinters all powder bed material as part of its process before full melting a local area to form the cross section of a part for each build layer. As a result, partially sintered material may become trapped within the internal passages.

There are currently few methods that directly and rapidly remove the conglomerated powder. One standard practice may include repeated use of an accelerated media blast, combined with mechanically scraping. Another standard practice includes, mega sonic or ultrasonic vibratory methods to liberate the powder particles. Oftentimes, such practices are still inefficient at removal of removing conglomerated powder from within the internal passages.

SUMMARY

A tool according to one disclosed non-limiting embodiment of the present disclosure can include a flexible section; a head that extends from the flexible section; an emitter within the head; and a nozzle to eject a cooling fluid therefrom.

A further embodiment of the present disclosure may include, wherein the emitter includes a fiber optic laser.

A further embodiment of the present disclosure may include, wherein the cooling fluid includes chilled water.

A further embodiment of the present disclosure may include, wherein the cooling fluid includes liquid nitrogen.

A further embodiment of the present disclosure may include, wherein the cooling fluid includes liquid helium.

A further embodiment of the present disclosure may include, wherein operation of the emitter and ejection of the cooling fluid alternate.

A further embodiment of the present disclosure may include at least one groove within an outer diameter of the flexible section.

A further embodiment of the present disclosure may include, wherein the at least one groove spirals around the outer diameter of the flexible section.

A further embodiment of the present disclosure may include, wherein the flexible section is steerable.

A further embodiment of the present disclosure may include an air jet within the head.

A further embodiment of the present disclosure may include a camera within the head.

A further embodiment of the present disclosure may include, wherein the emitter is adjacent to the nozzle.

A further embodiment of the present disclosure may include, wherein the nozzle surrounds the emitter.

A method of additively manufacturing a component according to another disclosed non-limiting embodiment of the present disclosure can include delivering a series of thermal shocks with a tool to a conglomerated powder within an internal passage of an additively manufactured component to facilitate removal of the conglomerated powder.

A further embodiment of the present disclosure may include alternating operation of the emitter and ejection of a cooling fluid thereby delivering the series of thermal shocks.

A further embodiment of the present disclosure may include inducing sufficient internal CTE (Coefficient of Thermal Expansion) differential strain to fracture the weak bonds between partially sintered metal particles of the conglomerated powder.

A further embodiment of the present disclosure may include cleaning conglomerated powder from the powder with the tool subsequent to completion of the additive manufacturing.

A further embodiment of the present disclosure may include transporting the conglomerated powder out of the internal passage along spiral grooves in the tool.

A further embodiment of the present disclosure may include, wherein the internal passage defines an aspect ratio with a diameter to length of less that 1:4.

A further embodiment of the present disclosure may include, wherein the internal passage is a non-line of sight passage.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The components in the drawings are not necessarily to scale. Moreover, in the drawings, like reference numerals designate corresponding parts throughout the several views. The drawings that accompany the detailed description can be briefly described as follows.

DETAILED DESCRIPTION

Figure 1:
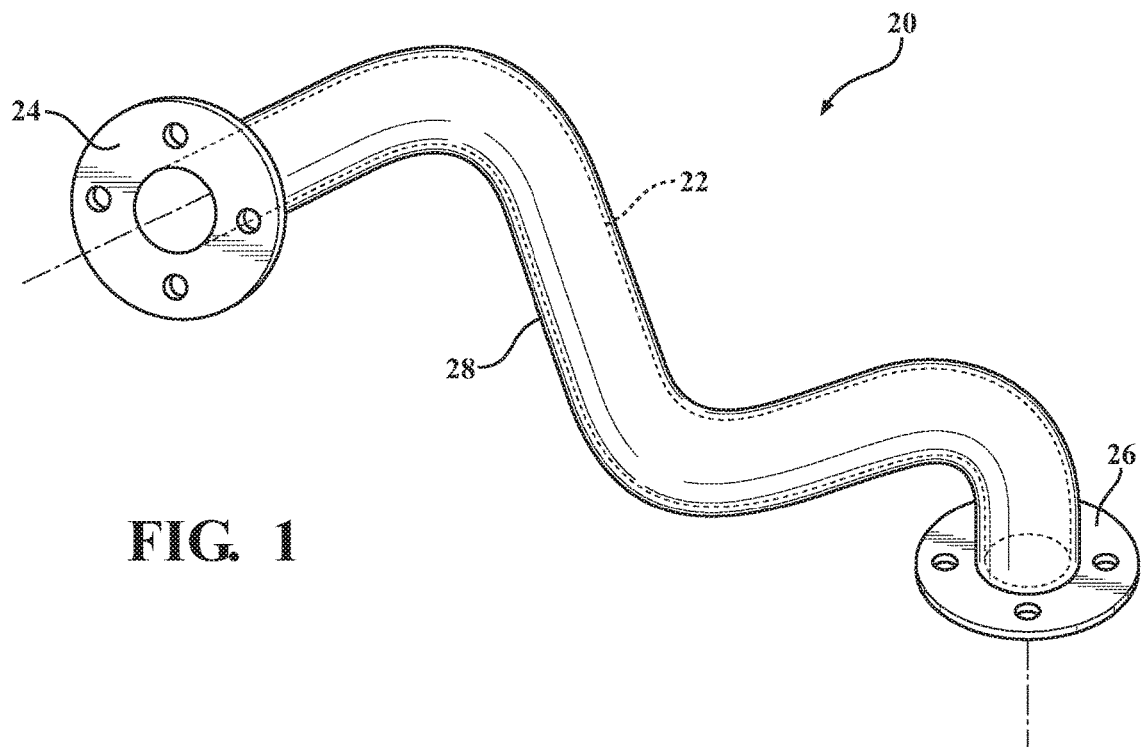
FIG. 1 is a perspective view of a representative additively manufactured component with an internal passage.

FIG. 1 schematically illustrates a component 20 that includes an internal passage 22. In this example, the component 20 may be a conduit such as that of a manifold, duct, flow passage, or other such component. The component 20 may include a first flange 24, a second flange 26, and a conduit 28 with the internal passage 22 therebetween. The internal passage 22 may be complex and be of a non-line of sight geometry that includes multiple bends. It should be appreciated that various additional or alternative segments and/or fittings may also be provided. It should be further appreciated that although a conduit type example is illustrated herein, other aerospace components, aircraft structures, as well as a wide variety of applications outside the aerospace industry, which include relatively weak partially sintered metallic powder found inside deep recesses, holes, passages, and internal cavities will benefit herefrom.

The component 20 may be readily manufactured with an additive manufacturing process that includes but are not limited to, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Laser Powder Bed Fusion (LPBF) and others. Although particular additive manufacturing processes are disclosed, those skilled in the art of manufacturing will recognize that any other suitable rapid manufacturing methods using layer-by-layer construction or additive fabrication can alternatively be used.

The additive manufacturing process sequentially builds-up layers of atomized alloy and/or ceramic powder material that include but are not limited to, steel alloys, stainless steel alloys, titanium alloys, nickel alloys, aluminum alloys and others in atomized powder material form. Nickel alloys may have specific benefit for parts that operate in high temperature environments, such as, for example, environments typically encountered by aerospace and gas turbine engine components.

The additive manufacturing process fabricates or "grows" of components using three-dimensional information, for example a three-dimensional computer model. The three-dimensional information is converted into a plurality of slices, each slice defining a cross section of the component for a predetermined height of the slice. The additive manufactured component 20 is then "grown" slice-by-slice, or layer-by-layer, until finished. Each layer has an example size between about 0.0005-0.001 inches (0.0127-0.0254 mm). The additive manufacturing process facilitates manufacture of the relatively complex internal passage geometry to minimize assembly details, gun-drilling, and multi-component construction.

In one example, the internal passage 22 may define an aspect ratio with a diameter to length of less that 1:4 and may be a non-line of sight, e.g., non-straight passage. In this non-limiting dimension embodiment, the internal diameter 22D dimension of the internal passage 22 is between about 0.25 and 2.0 inches (about 6-50 mm) in diameter. It should be appreciated that this is but one example, and various relationship may otherwise benefit herefrom.

Figure 2:
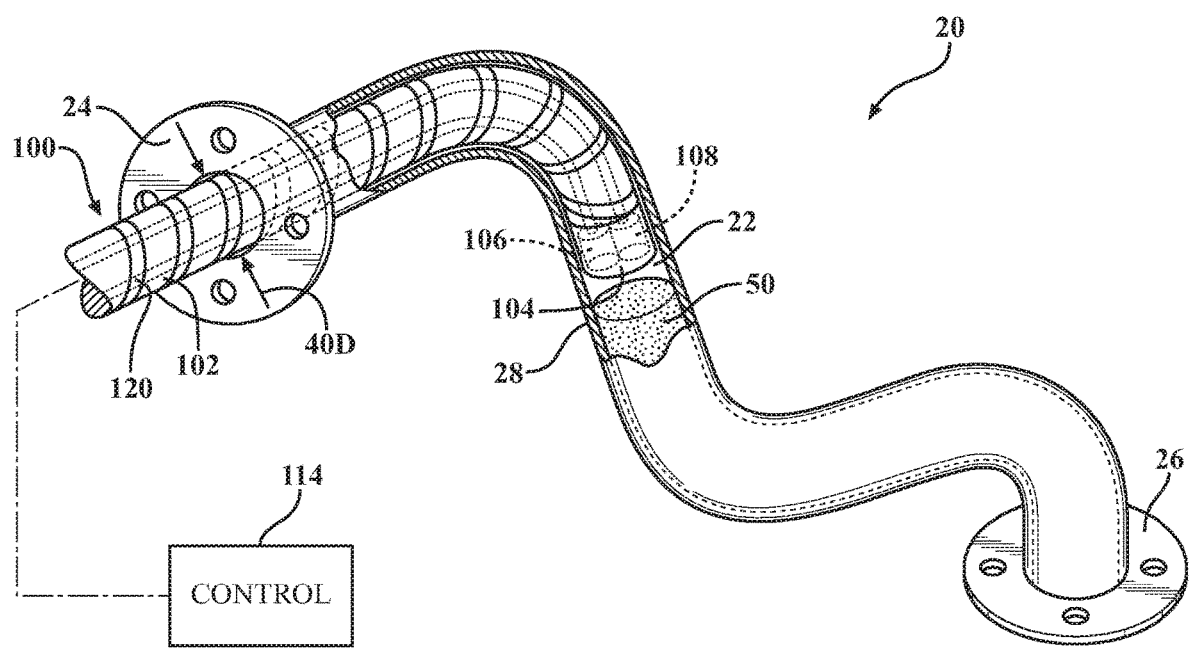
FIG. 2 is a perspective view of the additively manufactured component of FIG. 1 with a tool according to one disclosed non-limiting embodiment for removing conglomerated powder from within the internal passage.
Figure 3:
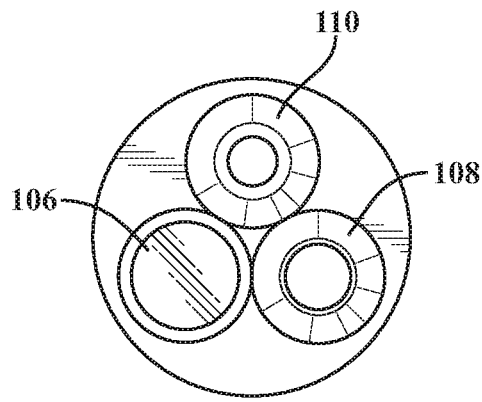
FIG. 3 is a front view of the head of the tool according to one disclosed non-limiting embodiment.

With reference to FIG. 2, a tool 100, according to one disclosed non-limiting embodiment, is schematically illustrated. The tool 100 generally includes a flexible section 102 with a head 104 that includes an emitter 106 such as fiber optic laser, and a nozzle 108 for a relatively cold fluid such as liquid nitrogen, liquid helium, water, and/or other fluids. The head 104, in other non-limiting embodiment, may further include an air nozzle 110 (FIG. 3) for pressurized airflow to facilitate, for example, debris removal and/or a fiber optic camera 112 (FIG. 4) to provide real time examination of the process.

The flexible section 102 originates with the head 104 and may be sized to the particular internal passage 22. That is, the diameter of the flexible section 102 may be utilized to, for example, provide a desired surface finish to the internal passage 22. The size (diameter, length) of the tool 100 may also be readily scaled to conform with conventional metric or standard hole diameters or custom built to a desired diameter and length.

Figure 4:
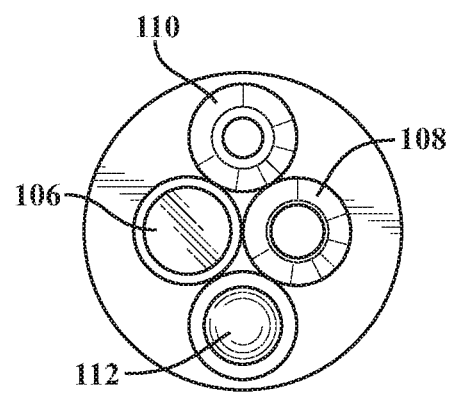
FIG. 4 is a front view of the head of the tool according to another disclosed non-limiting embodiment.
Figure 5:
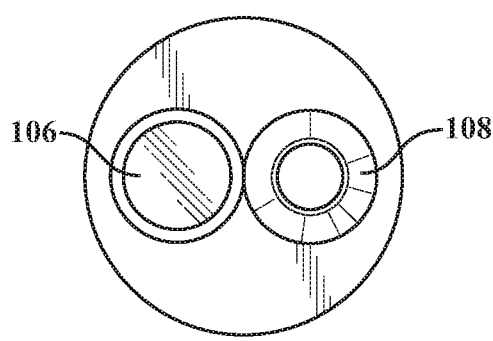
FIG. 5 is a front view of the head of the tool according to another disclosed non-limiting embodiment.
Figure 6:
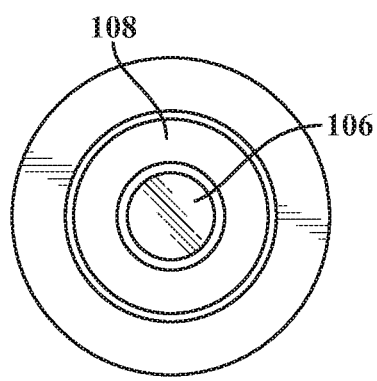
FIG. 6 is a front view of the head of the tool according to another disclosed non-limiting embodiment.

The head 104 may be of various configurations such as a side-by-side arrangement of the emitter 106 and the nozzle 108 (FIG. 5), or a coaxial arrangement in which the emitter 106 is surrounded by an annular nozzle 108 (FIG. 6). It should be appreciated that other orientations and arrangements may alternatively be provided such as a triangular arrangement with the air nozzle 110 (FIG. 3), or a quad arrangement with the air nozzle 110 and the fiber optic camera 112 (FIG. 4).

With continued reference to FIG. 2, in one disclosed non-limiting embodiment, the flexible section 102 may include a steering system 114 to facilitate movement through a non-line of sight passage and targeting of the head 102 therein. The flexible section 102 may also include grooves 120 that spiral, or otherwise extend around and/or along an outer diameter 110 of the flexible section 102. The grooves 120 facilitate the transition of liberated material out of the passage 22, similar to how material travels up the grooves in a drill.

The tool 100 is operable to deliver a rapid series of sharp and severe thermal shocks to the surface of the partially sintered metal powder targeted for removal. The rapid and extreme change in the surface temperature of the partially sintered metal powder is desirable to induce sufficient internal CTE (Coefficient of Thermal Expansion) differential strain to fracture the weak bonds between the partially sintered metal particles. The more severe the thermal gradient between the surface and the subsurface partially sintered metal powder material, the more effective the fracture process. The pulsed heating from the emitter 106 and the cooling fluid from the nozzle 108 generate large thermal gradients in short periods of time. The selected cooling fluid primarily determines the cost, frequency, and severity of the thermal shocks that can be delivered to a surface. For example, liquid helium is 4.2 degrees Kelvin (−452 F) at ambient pressure and the most costly while liquid nitrogen is 77 degrees Kelvin (−321 F) at ambient pressure and is relatively inexpensive. Further, chilled or ambient temperature water is the least expensive.

Figure 7:
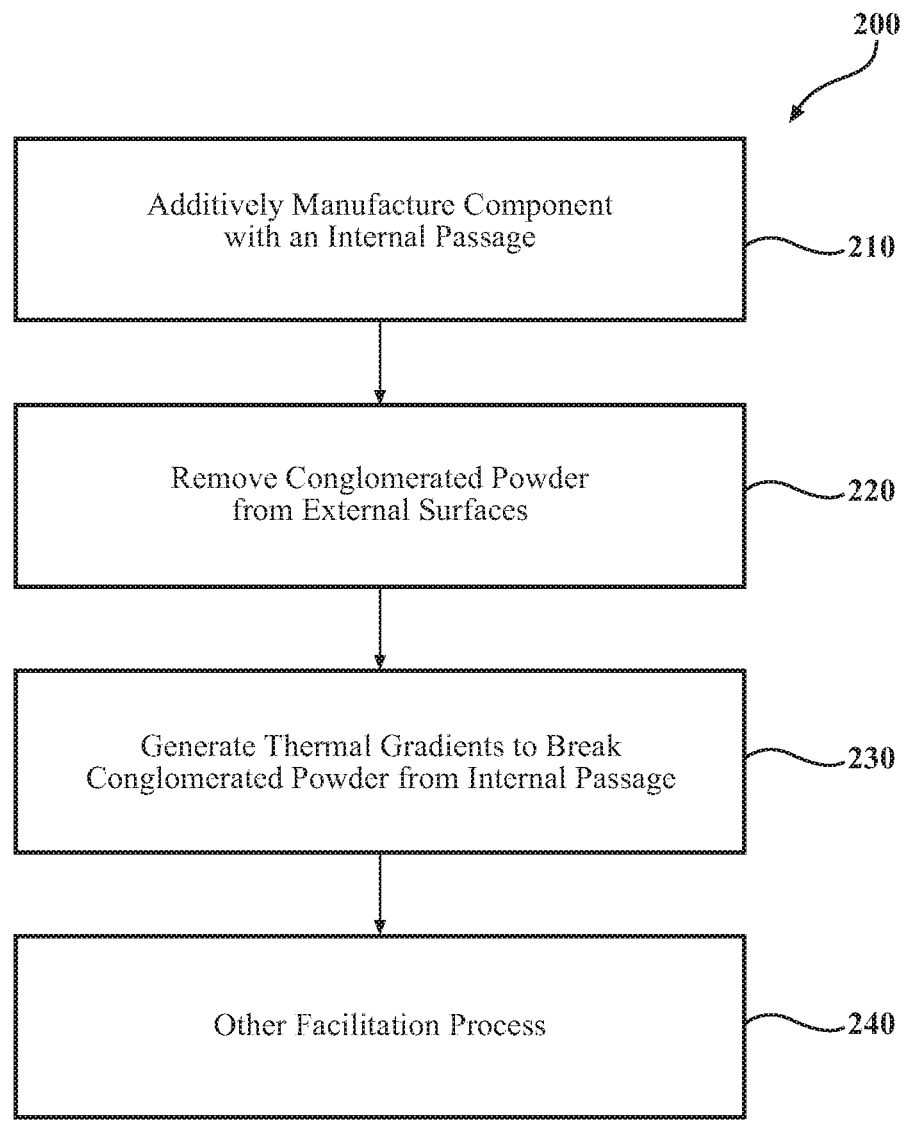
FIG. 7 is a method of additively manufacturing a component according to one disclosed non-limiting embodiment.
Figure 8:
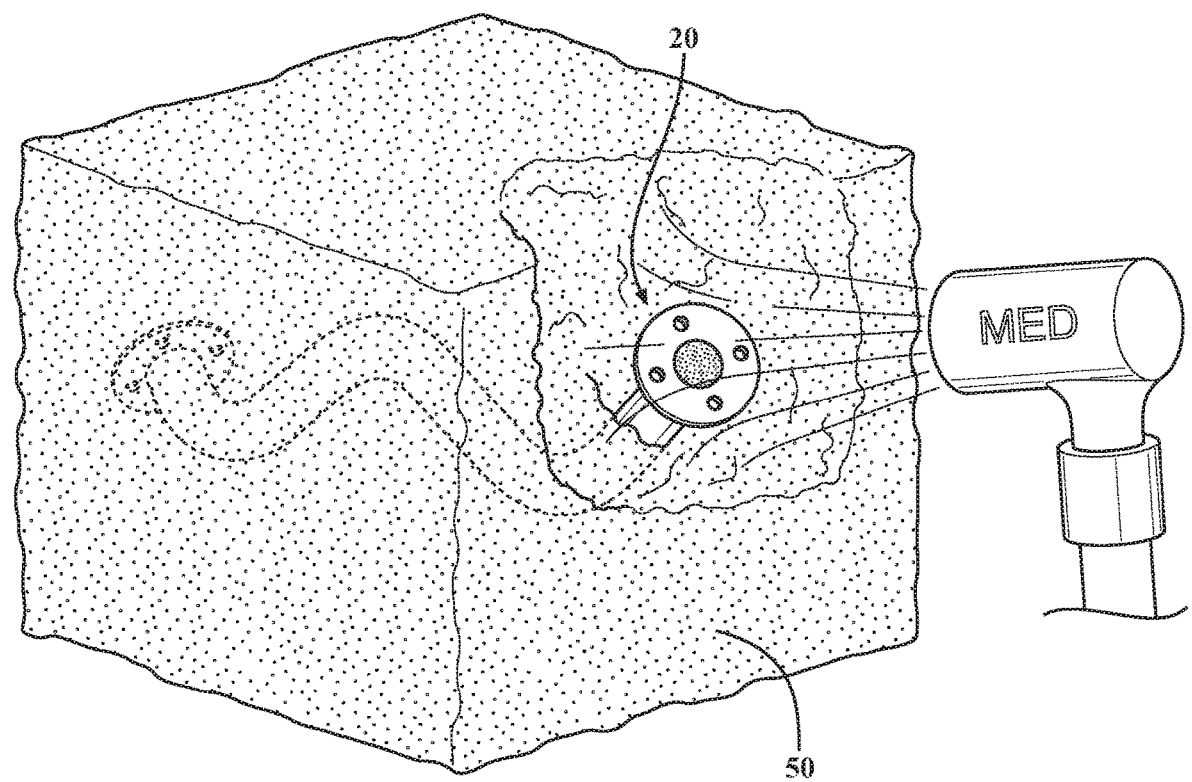
FIG. 8 is a perspective view of one step in the method of additively manufacturing a component.

With reference to FIG. 7, one disclosed non-limiting embodiment of a method 200 to additively manufacture the component 20 initially includes additively manufacturing the component 20 with an internal passage 22 (step 210). The internal passage 22 is often a non-line of sight panel.

Next, conglomerated powder 50 is removed from the external surfaces of the completed additively manufactured component 20 (step 220). Removal is conventional and may include the use of accelerated media blast, mechanically scraping, vibratory or other methods.

Next, the tool 100 is directed to generate relatively large thermal gradients in short periods of time to break-up the partially sintered metal powder particles from within the internal passage 22 (step 230; FIG. 2).

In conjunction with generation of the relatively large thermal gradients, other facilitating processes (step 240) such as the air jet, vacuum, rotary worm, vibration, work piece reorientation, and/or periodic fluid flushing may be utilized to facilitate debris removal.

The utilization of the tool 100 readily facilitates direct and rapid removal of the conglomerated powder from within internal passages.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of additively manufacturing a component, comprising:
    additively manufacturing a component with a non-line of sight internal passage, the non-line of sight internal passage containing a conglomerated powder from additively manufacturing; and
    delivering a series of thermal shocks with a tool to the conglomerated powder within the non-line of sight internal passage within the additive manufactured component, the series of thermal shocks operable to generate a thermal gradient within the conglomerated powder, breaking the conglomerated powder to facilitate removal of the conglomerated powder from within the non-line of sight internal passage.

2. The method as recited in claim 1, further comprising inducing sufficient internal CTE (Coefficient of Thermal Expansion) differential strain to fracture the weak bonds between partially sintered metal particles of the conglomerated powder.

3. The method as recited in claim 1, further comprising transporting the conglomerated powder out of the internal passage along spiral grooves in the tool.

4. The method as recited in claim 1, wherein the internal passage defines an aspect ratio with a diameter to length of less than 1:4.

5. A method of additively manufacturing a component, comprising:
    additively manufacturing a component with a non-line of sight internal passage, the non-line of sight internal passage containing a conglomerated powder;
    alternating a series of light emissions with ejecting of cooling fluid from a tool extending within the non-line of sight internal passage, the alternating of the series of light emissions with the ejecting of cooling fluid operable to generate a thermal shock within the conglomerated powder, breaking the conglomerated powder to facilitate removal of the conglomerated powder from within the non-line of sight internal passage.

6. The method as recited in claim 5, wherein the internal passage defines an aspect ratio with a diameter to length of less than 1:4.

7. The method as recited in claim 5, wherein the emitter includes a fiber optic laser.

8. The method as recited in claim 5, wherein the cooling fluid includes chilled water.

9. The method as recited in claim 5, wherein the cooling fluid includes liquid nitrogen.

10. The method as recited in claim 5, wherein the cooling fluid includes liquid helium.

11. The method as recited in claim 5, further comprising transporting the conglomerated powder out of the internal passage along spiral grooves in the tool.

12. The method as recited in claim 5, further comprising steering the tool.

13. The method as recited in claim 12, wherein steering the tool comprises moving a flexible section of the tool.

14. The method as recited in claim 5, further comprising a head that extends from the flexible section, the head comprises an emitter and a nozzle.

* * * * *